(12) United States Patent
Khan

(10) Patent No.: US 6,212,624 B1
(45) Date of Patent: Apr. 3, 2001

(54) SELECTIVE CANONIZING ON MODE TRANSITIONS

(75) Inventor: Arif I. Khan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/164,409

(22) Filed: Sep. 30, 1998

(51) Int. Cl.[7] .................................................. G06F 9/30
(52) U.S. Cl. .............................................................. 712/217
(58) Field of Search .............................. 712/23, 217, 43

(56) References Cited

U.S. PATENT DOCUMENTS 5,857,096 * 1/1999 Bistry et al. ........................ 371/229

* cited by examiner

Primary Examiner—David Y. Eng
(74) Attorney, Agent, or Firm—Blakely, Sokoloff, Taylor & Zafman LLP

(57) ABSTRACT

The present invention is a method and apparatus for canonizing a register set on a mode transition. A reference to the register set during instruction decoding is detected. A flag based on a result of the detecting and a type of the mode transition is generated. The generated flag is used to control a microcode to canonize the register set.

21 Claims, 4 Drawing Sheets

SELECTIVE CANONIZING ON MODE TRANSITIONS

BACKGROUND

1. Field of the Invention

This invention relates to computer systems. In particular, the invention relates to canonizing registers.

2. Description of Related Art

An out-of-order processor uses register renaming for enhancing performance. Special arithmetic instructions usually reference the corresponding special registers. For example, in a single instruction multiple data (SIMD) floating-point (FP) processor, there are registers specifically designed for SIMD FP instructions. During the execution of SIMD FP instructions, the SIMD FP registers are renamed and are associated with different physical locations. The renaming information or mapping is stored in a table.

A processor may be used in different modes based on the format of the data representation. A processor may have multiple modes based on the instruction set being used. For example, one mode may be the legacy mode and another mode may be a new extended instruction set. When register renaming is used in one mode and not the other, any transition from one mode to the other may lead to loss of renaming information. For example, the Intel processor family has two modes: an Intel Value Engine (iVE) mode and an Intel Architecture (IA) 64-bit mode (IA64). On an instruction set architecture (ISA) transition from iVE to IA64, the mapping tables are reset and the renaming information is lost.

To preserve the SIMD FP registers across the ISA transitions, the renaming information is to be returned to the canonical space. This process is referred to as canonizing.

During the process of canonizing, each SIMD FP register is to be moved from the renamed space to the canonical space. For each SIMD FP register, two accesses are necessary. For eight registers, this results in sixteen instructions being issued, executed, and retired. This causes the length of the ISA transition to be increased, slowing down the transition.

Therefore, there is a need in the technology to provide a simple and efficient method to canonize registers on transition from one mode to another mode.

SUMMARY

The present invention is a method and apparatus for canonizing a register set on a mode transition. A reference to the register set during instruction decoding is detected. A flag based on a result of the detecting and a type of the mode transition is generated. The generated flag is used to control a microcode to canonize the register set.

BRIEF DESCRIPTION OF THE DRAWINGS

The features and advantages of the present invention will become apparent from the following detailed description of the present invention in which.

DESCRIPTION

The present invention is a method and apparatus for selectively canonizing a register set on mode transitions. The technique controls a canonizing flag based on the history of the instruction decoding process. The canonizing flag is used to provide a branch condition to a microsequencer depending on whether there is a register-referencing instruction being decoded. Canonizing, therefore, is performed when necessary, rather than on all transitions. The technique therefore provides fast mode transitions.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
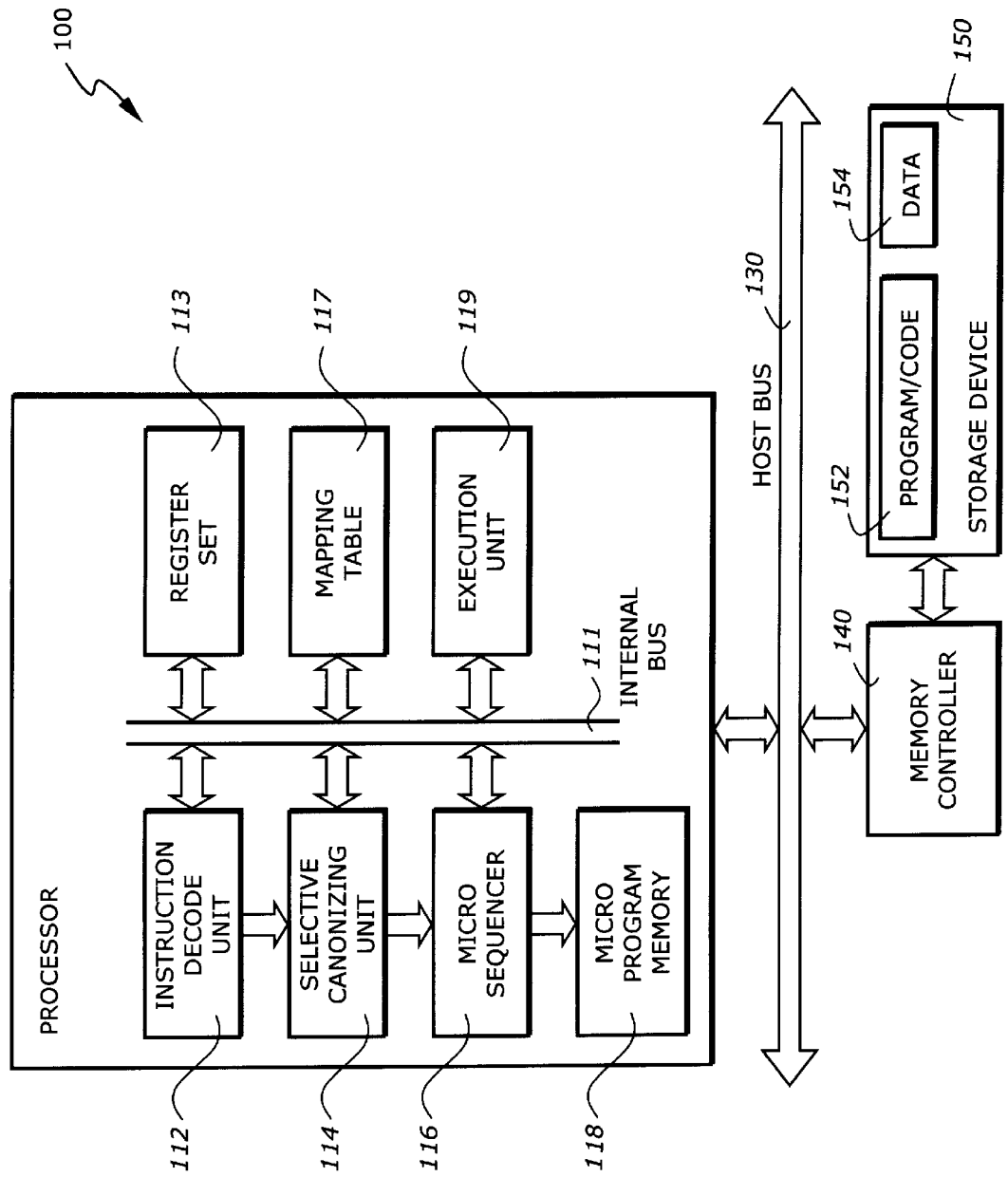
FIG. 1 is a diagram illustrating a computer system in which one embodiment of the invention can be practiced.

FIG. 1 is a diagram illustrating one embodiment of a computer system 100 in which one embodiment of the present invention may be utilized. The computer system 100 comprises a processor 110, a host bus 130, a memory controller 140, and a storage device 150.

The processor 110 represents a central processing unit of any type of architecture, such as complex instruction set computers (CISC), reduced instruction set computers (RISC), very long instruction word (VLIW), or hybrid architecture. While this embodiment is described in relation to a single processor computer system, the invention could be implemented in a multi-processor computer system.

The memory controller 140 provides various access functions to the storage device 150. The memory controller 140 is coupled to the host bus 130 to allow the processor to access the storage device 150. The storage device 150 represents one or more mechanisms for storing information. For example, the storage device 150 may include non-volatile or volatile memories. Examples of these memories include flash memory, read only memory (ROM), or random access memory (RAM).

FIG. 1 also illustrates that the storage device 150 has stored therein program code 152 and data 154. The program code 152 represents the code using any and/or all of the techniques in the present invention. The data 154 represents data used by the program code 152, graphics data and temporary data. Of course, the storage device 150 preferably contains additional software (not shown), which is not necessary to understanding the invention.

FIG. 1 additionally illustrates that the processor 110 includes an internal bus 111, a decode unit 112, a register set 113, a selective canonizing unit 114, a micro-sequencer 116, a micro-program memory 118, a mapping table 117, and an execution unit 119. Of course, the processor 110 contains additional circuitry, which is not necessary to understanding the invention.

The decode unit 112 is used for decoding instructions received by processor 110 into control signals and/or microcode entry points as generated by the micro-sequencer 116. The selective canonizing unit 114 provides a control or flag signal to the micro-sequencer 116 to perform the canonizing. The micro-sequencer 116 generates the address of the micro-routine stored in the micro program memory 118. The micro program memory 118 produces a sequence of micro-operations, or microcode which control the execution unit 119 to perform the appropriate operations.

The register set 113 represents a storage area on processor 110 for storing information, including control/status information, numeric data. In one embodiment, the register set 113 include a number of floating-point registers used by a floating-point unit. The mapping table 117 stores the mapping information about register renaming.

Figure 2:
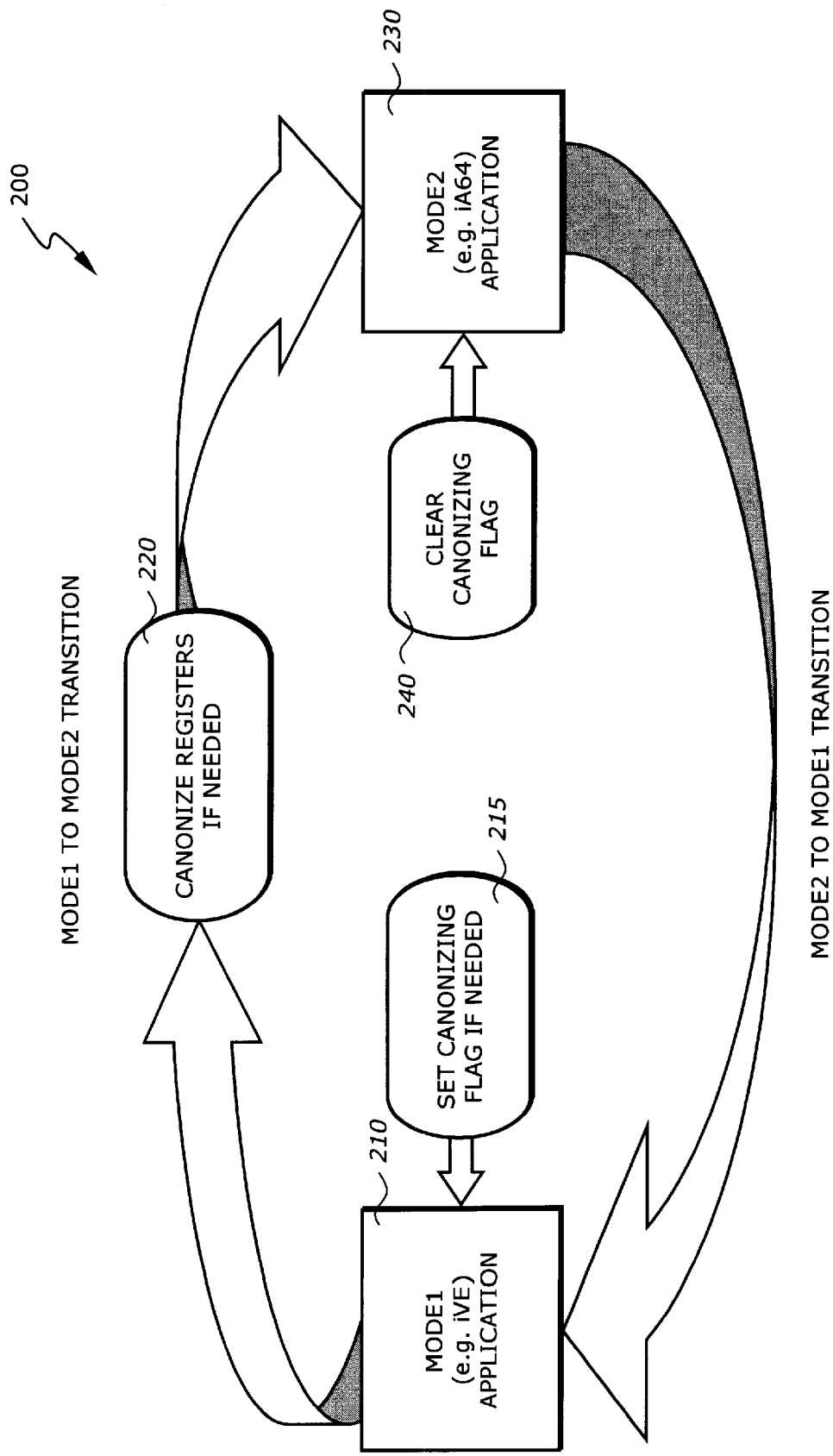
FIG. 2 is a diagram illustrating a mode transition according to one embodiment of the invention.

FIG. 2 is a diagram illustrating a mode transition according to one embodiment of the invention. The mode transition includes a mode1 application 210, a mode2 application 230, a mode1-to-mode2 transition 220, and a mode2-to-mode1 transition 240.

The mode1 application 210 is an application in a first mode using a first processor architecture, e.g., iVE. The mode2 application 230 is an application in a second mode using a second processor architecture, e.g., IA64. Typically one of the processor architectures is an enhancement of the other architecture. For example, the IA64 is an enhancement of the iVE. In addition, although the two architectures may be different, they share similar instruction set so that software compatibility can be maintained.

The mode1-to-mode2 transition 220 occurs when the application program changes from mode1 to mode2. When this transition occurs, the canonizing flag has been set if there has been at least one register reference in the mode1 application 210. This is achieved by tracking the history of the decoding unit during instruction decoding. The canonizing flag is used to control the microcode to jump to the micro-routine which performs the canonizing. If there is a register referencing in the mode1 application, then the canonizing flag is set to indicate that canonizing is necessary. If there is no register referencing in the mode1 application, the canonizing flag is reset to indicate that canonizing is unnecessary.

The mode2-to-mode1 transition 240 occurs when the application program changes from mode2 to mode1. The canonizing flag is cleared after the registers have been canonized during a mode1-to-mode2 transition. This indicates that no further canonizing is necessary.

Figure 3:
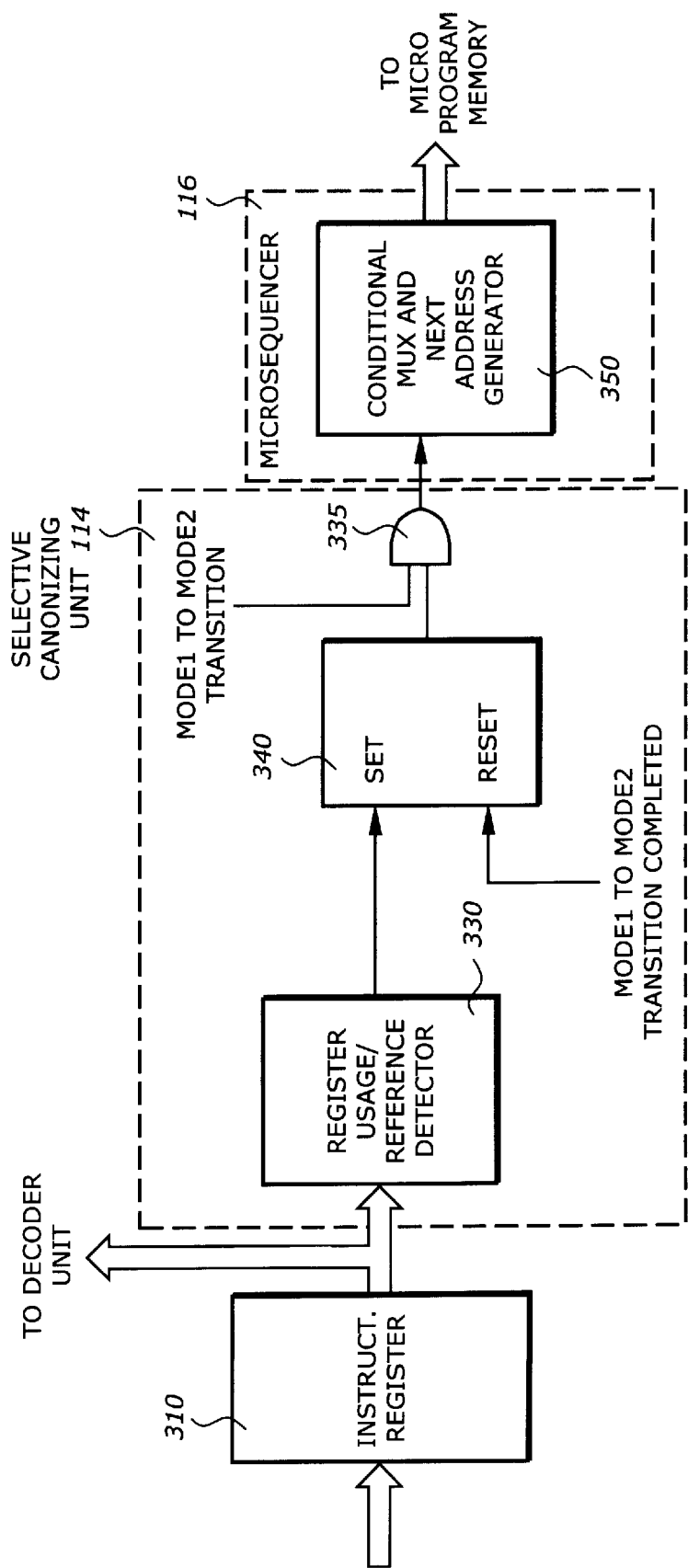
FIG. 3 is a diagram illustrating a selective canonizing unit according to one embodiment of the invention.

FIG. 3 is a diagram illustrating a selective canonizing unit according to one embodiment of the invention. The selective canonizing unit 114 is coupled with an instruction register 310 and the micro-sequencer 116.

The instruction register 310 stores the instruction to be decoded. The instruction is fetched from the memory, e.g., from a code cache. The instruction is then decoded by the decoder unit 112. The selective canonizing unit 114 includes a register usage/reference detector 330, a gating element 335, and a flag generator 340. The micro-sequencer 116 includes a conditional multiplexer and next address generator 350.

The register usage/reference detector 330 includes circuitry that detects if there is a register referencing in the instruction. The register usage/reference detector 330 may include portion of the decoder unit that keeps track of the history of the decoded instructions. In addition, the instruction may be decoded speculatively causing the register usage/reference detector 330 to detect a register reference although it may turn out not to be true. However, in this situation, there is no incorrect result because canonizing a register which has not been renamed does not cause any harm.

The register usage/reference detector 330 may be a simple decoder which asserts a signal when the instruction in the instruction register 310 is a register-referencing instruction. In one embodiment, the register usage/reference detector 330 detects if the instruction is an SIMD FP instruction. This can be achieved by using AND gates to gate the bit patterns that define the instructions. These AND gates are then followed by an OR gate. Of course this function is usually performed by the instruction decode unit 112 (FIG. 1). In that case, the register usage/reference detector 330 may receive a signal from the instruction decode unit 112 which indicates whether the instruction being decoded is a register-referencing instruction.

The gating element 335 gates the output of the register usage/reference detector 330 with the mode1-to-mode2 transition signal. The mode1-to-mode2 transition signal is asserted whenever there is a transition from the mode1 application to the mode2 application. In one embodiment, the gating element 335 is an AND gate.

The flag generator 340 generates a canonize flag to the micro-sequencer 116. The flag generator 340 has two inputs: set and reset. When the set input is asserted, the canonize flag is set to logic HIGH. When the reset input is asserted, the canonize flag is reset to logic LOW. In one embodiment, the flag generator 340 is a flip-flop with set and clear inputs. The flag generator 340 receives the output of the gating element 335 at the set input. When this output is asserted HIGH, the canonize flag is set HIGH. Therefore, the canonize flag is set HIGH when there is a register reference in the instruction and there is a mode1-to-mode2 transition. The flag generator 340 receives a mode1-to-mode2 transition-complete signal at the reset input. Therefore, when a mode1-to-mode2 transition completes, the canonize flag is reset LOW.

The conditional multiplexer and next address generator 350 receives the canonize flag and other conditional flags and generates the next address to the micro-program memory accordingly. When the canonize flag is set, the conditional multiplexer and next address generator 350 directs control to a micro-routine that performs canonizing. When the canonize flag is reset, the conditional multiplexer and next address generator 350 skips the canonizing and proceeds the sequencing as usual.

The selective canonizing essentially canonizes the registers based on the condition that any of the previously decoded instructions since the last mode1-to-mode2 transition was a register-referencing instruction, e.g., a SIMD FP instruction. By canonizing the register set only when necessary, significant time can be saved on a mode transition.

Figure 4:
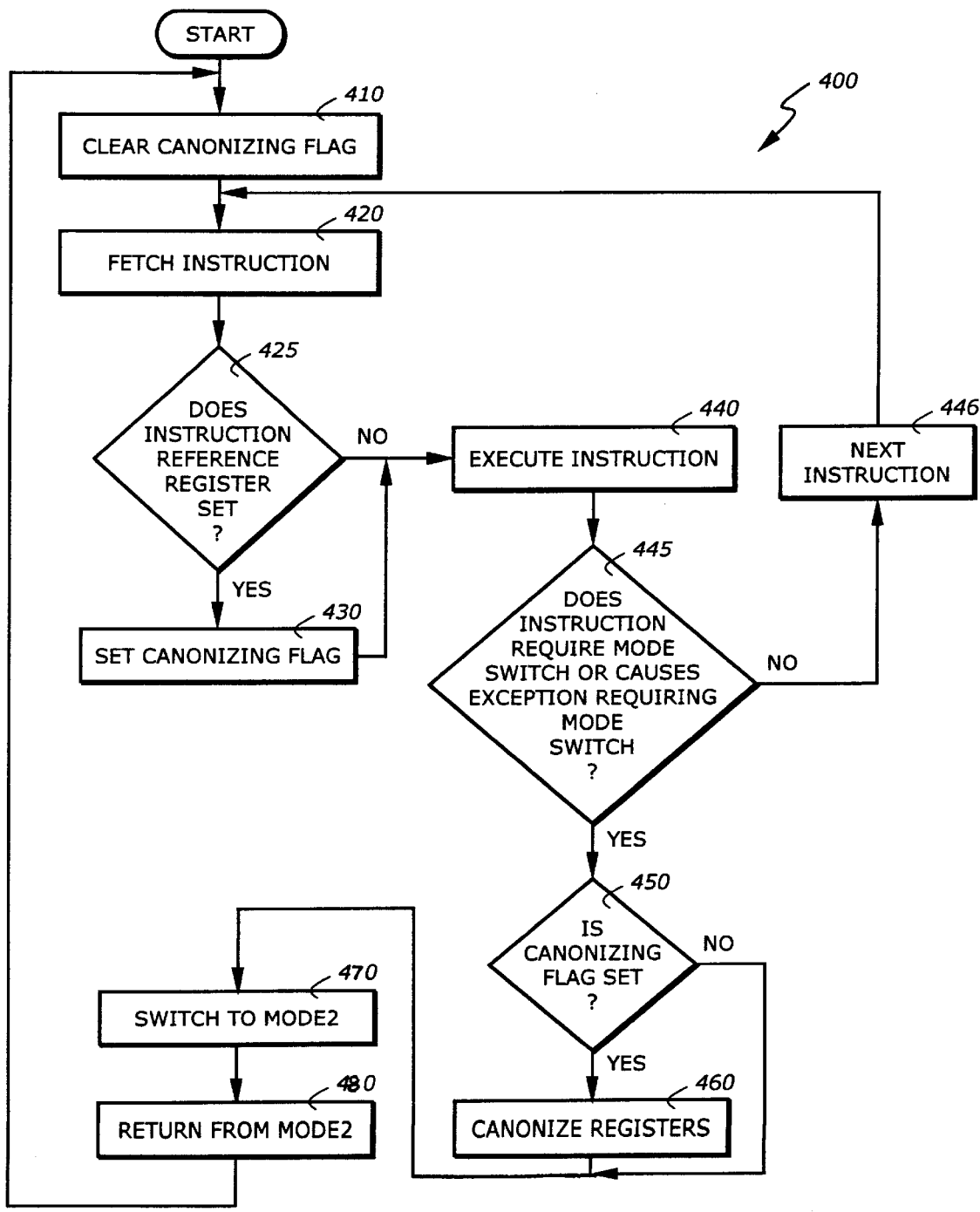
FIG. 4 is a flowchart illustrating a process of selective canonizing according to one embodiment of the invention.

Let CANONIZE be the flag that indicates that a register referencing instruction has been decoded, CAN_REG be the microcode routine that performs canonizing, and SKIP_CAN_REG be the microcode routine that skips canonizing. The selective canonizing process can be described as:

If (not CANONIZE) then jump to SKIP_CAN_REG
   else CAN_REG;
SKIP_CAN_REG;

FIG. 4 is a flowchart illustrating a process 400 of selective canonizing according to one embodiment of the invention.

Upon START, the process 400 clears the canonizing flag (Block 410). Then the process 400 fetches the instruction (Block 420). It is then determined if the fetched instruction references the register set (Block 425). If the fetched instruction references the register set, the process 400 sets the canonizing flag (Block 430) and then proceeds to block 440. Otherwise, the process 400 executes the instruction (Block 440).

Then it is determined if the instruction requires a mode switch or causes an exception requiring a mode switch (Block 445). If not, the process 400 returns to block 420. Otherwise, the process 400 determines if the canonizing flag is set (Block 450). If the canonizing flag is set, the process 400 proceeds to canonize the registers (Block 460) and goes to block 470. Otherwise, the process 400 switches to mode2 (Block 470) and returns from mode2 (Block 480). The process 400 the returns to block 410 to continue the sequence.

Therefore, the present invention is a technique to canonize the register set on transition from one mode to another mode. The canonizing is selectively performed based on the history of the instruction decode unit. The technique is fast and simple, requiring negligible hardware.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   (a) detecting a reference to the register set during instruction decoding;
   (b) generating a flag based on the detected reference and a type of a mode transition; and
   (c) controlling a sequencer of a microcode to provide an address to a routine in the microcode, the routine canonizing the register set according to the generated flag.

2. The method of claim 1 wherein the type of the mode transition is one of a first type and a second type.

3. The method of claim 2 wherein the first type is a transition from a firs t mode to a second mode and the second type is a transition from a second mode to a first mode.

4. The method of claim 3 wherein the first mode uses register renaming to rename at least one registor in the register set.

5. The method of claim 4 wherein the generating includes setting the flag if the reference to the register set is detected and the type of the mode transition is the first type.

6. The method of claim 4 wherein the generating includes resetting the flag if the reference to the register set is not detected or the type of the mode transition is the second type.

7. The method of claim 6 wherein the controlling sequencer includes providing the address to the routine in the microcode to canonize the register set when the flag is set.

8. An apparatus comprising:
   (a) a detector to detect a reference to a register set during instruction decoding; and
   (b) a flag generator coupled to the detector to generate a flag based on the detected reference and a type of a mode transition, the flag controlling a sequencer of a microcode to provide an address to a routine in the microcode, the routine canonizing the register set.

9. The apparatus of claim 8 wherein the type of the mode transition is one of a first type and a second type.

10. The apparatus of claim 9 wherein the first type is a transition from a first mode to a second mode and the second type is a transition from a second mode to a first mode.

11. The apparatus of claim 10 wherein the first mode uses register renaming to rename at least one register in the register set.

12. The apparatus of claim 11 wherein the flag generator sets the flag if the reference to the register set is detected and the type of the mode transition is the first type.

13. The apparatus of claim 11 wherein the flag generator resets the flag if the reference to the register set is not detected or the type of the mode transition is the second type.

14. The apparatus of claim 11 wherein the sequencer provides the address to the routine in the microcode to canonize the register set when the flag is set.

15. A processor comprising:
   a decode unit;
   a register set; and
   a selective canonizing unit coupled to the decode unit for selectively canonizing the register set on a mode transition, the selective canonizing unit comprising:
   (a) a detector to detect a reference to a register set during instruction decoding; and
   (b) a flag generator coupled to the detector to generate a flag based on the detected reference and a type of a mode transition, the flag controlling a sequencer of a microcode to provide an address to a routine in the microcode, the routine canonizing the register set.

16. The processor of claim 15 wherein the type of the mode transition is one of a first type and a second type.

17. The processor of claim 16 wherein the first type is a transition from a first mode to a second mode and the second type is a transition from a second mode to a first mode.

18. The processor of claim 17 wherein the first mode uses register renaming to rename at least one register in the register set.

19. The processor of claim 18 wherein the flag generator sets the flag if the reference to the register set is detected and the type of the mode transition is the first type.

20. The processor of claim 18 wherein the flag generator resets the flag if the reference to the register set is not detected or the type of the mode transition is the second type.

21. The processor of claim 18 wherein the sequencer provides the address to the routine in the microcode to canonize the register set when the flag is set.

* * * * *